3,776,955
PESTICIDAL SEMICARBAZIDE AND BIURET DERIVATIVES

James Zielinski, Kenilworth, N.J., assignor to Esso Research and Engineering Company, Linden, N.J.
No Drawing. Filed May 29, 1968, Ser. No. 732,858
Int. Cl. C07c *159/00*
U.S. Cl. 260—552 SC    9 Claims

ABSTRACT OF THE DISCLOSURE

Semicarbazides, especially the tetraalkylated thiosemicarbazides, and biuret derivatives, especially the mono- and di-thiobiuret derivatives, are effective fungicides, bactericides, and herbicides. Exemplary of preferred semicarbazides are those of the general formula

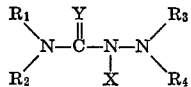

where $R_1$–$R_4$ can be unsubstituted or substituted hydrocarbyl and X can be hydrogen, or unsubstituted or substituted hydrocarbyl, and Y can be O or S.

Exemplary of preferred biuret derivatives are those of the general formula

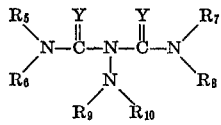

where $R_5$–$R_{10}$ can be H, or unsubstituted or substituted hydrocarbyl; and Y can be O or S. Typical $R_1$ to $R_{10}$ hydrocarbyl groups include: (1) saturated or unsaturated, acyclic or cyclic, aliphatics such as, e.g., ethyl, propargyl, cyclohexyl, cyclohexenyl, etc.; and (2) aromatic or hetero-aromatic radicals such as phenyl, pyridyl, etc.

FIELD OF THE INVENTION

This invention relates to novel semicarbazide, monothiobiuret, and dithiobiuret, derivatives and their use as pesticides. More particularly, this invention relates to tetra-substituted thiosemicarbazides; monothiobiuret and dithiobiuret derivatives; and their use as fungicides, bactericides, and herbicides, particularly as fungicides.

PRIOR ART

Substituted thiosemicarbazides, or thiocarbamoyl hydrazides as they are also termed, are well known in the literature. For example, the trialkylated species, i.e.,

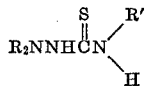

where $R_2$ is a lower alkyl group such as methyl or ethyl and R' is methyl or t-butyl, is disclosed in British Pat. 858,995. However, the significance of additional alkylation and the consequent potent fungicidal activity possessed by the tetraalkylated species are not disclosed or suggested by this British patent.

In addition, other thiosemicarbazides are known, as for example, the

compound shown in volume 59 of Chem. Abstracts, 13284a; or the compounds of the formula

where R=4-chloro, 2,6-dichloro, 2,4,5-trichloro, 4-methyl, 4-methoxy, etc. shown in German Pat. 1,174,103.

Also known are thiosemicarbazides of the formula

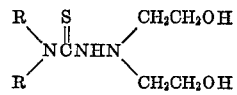

where R is hydrocarbyl.

However, none of the prior are thiosemicarbazides discloses the thiosemicarbazide compounds of this invention or their fungicidal activity.

Relative to the biuret derivatives of this invention, it is to be noted that several substituted dithiobiurets are known. For example U.S. Pat. 3,092,484 discloses compounds of the formula

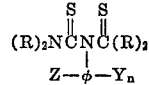

where R is $C_1$ to $C_4$ alkyl, Z is H, $NO_2$ or $C_1$–$C_4$ alkyl, Y is H or halogen, n is 1 to 3, and their use as herbicides. Moreover, German Pat. 859,150 discloses compounds of the formula

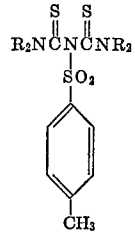

where $R_2$ is $CH_3$ or $C_2H_5$, or cycloalkyl such as penta- or tetramethylene, which compounds are known as vulcanizing accelerators. Disclosed, furthermore, in U.S. Pat. 2,704,244 are compounds of the general formula

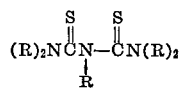

where R is given as hydrocarbyl.

However, unknown to the prior art concerned with biuret derivatives, which art is exemplified by the foregoing patents, are compounds resulting from the substitution of two dialkyl-thiocarbamoyl moieties on a molecule of an unsymmetrical-substituted hydrazine; unknown as well is the potent fungicidal activity of such compounds.

SUMMARY OF THE INVENTION

In general, the mono(-dialkylcarbamoyl) unsymmetrical-dialkyl-hydrazides, more popularly known as semicarbazides, are characterized by the formula:

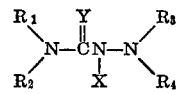

where $R_1$ to $R_4$ and X each represent an unsubstituted or substituted hydrocarbyl group such as $C_1$–$C_{30}$ unsubstituted or substituted hydrocarbyl; and Y is O or S. $R_1$ and $R_2$ and/or $R_3$ and $R_4$ together can also form a hydrocarbon chain, optionally interrupted by one or more hetero atoms, and X can also be H. $R_3$ anud $R_4$, however, as defined and employed in this invention are not

—$CH_2CH_2OH$

In general, the biuret derivatives of this invention are characterized by the following general formula

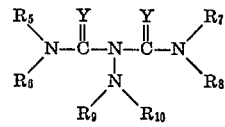

where $R_5$ to $R_{10}$ each represent a hydrogen atom, or an unsubstituted or substituted hydrocarbyl group such as $C_1$–$C_{30}$ unsubstituted or substituted hydrocarbyl; and Y is O or S. $R_5$ and $R_6$, and/or $R_7$ and $R_8$, and/or $R_9$ and $R_{10}$ together can also form a hydrocarbon chain, which may or may not be optionally interrupted by one or more hetero atoms. When either Y moiety is O and the other is S, the resultant molecule is termed mono-thiobiuret; and when both Y moieties are S, the molecule is termed dithiobiuret.

The semicarbazides of this invention can be most efficiently prepared by the following synthetic methods. For example, these products can be prepared by the following method. Method 1, in which a carbamoyl chloride or thiocarbamoyl chloride is reacted with an appropriately substituted hydrazine in accordance with the following equation:

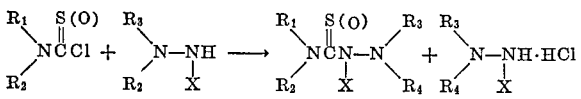

When the thiocarbamoyl chloride reactant is used, it can be prepared by well known methods such as those disclosed in "Organic Synthesis," vol. 4, page 307 (1963); A. L. Birkofer and K. Krebs, Tetrahedron Letters, vol. 885 (1968), etc. The hydrazine reactant is readily available commercially or can be prepared by a variety of conventional methods as, for example, shown in "Organic Synthesis," vol. II, page 211 (1943).

When X, $R_3$, and $R_4$ are not hydrogen, the hydrazine can be prepared by the technique shown in the Journal of the American Chemical Society in an article by R. T. Beltrami and E. R. Bissell, vol. 78, 2467 (1956).

Another, or alternative method for preparing the thiosemicarbazides of this invention, denominated as Method 2, is schematically represented in the following equations:

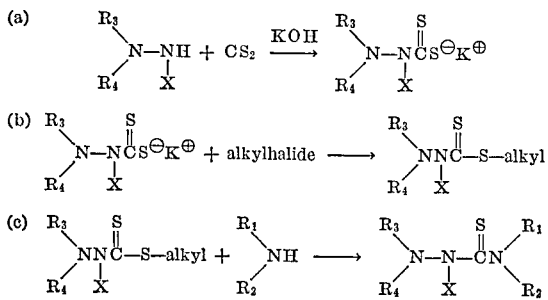

An alternative scheme to Equation 2, Method 2(a) is shown in Equation 3.

Equation 3

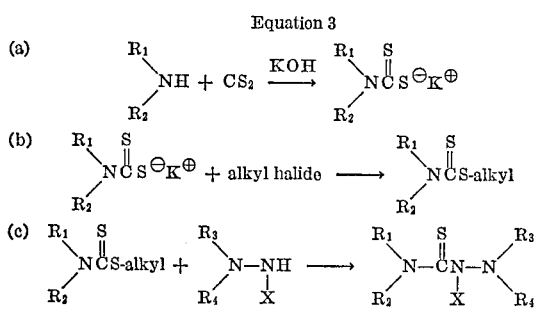

The mono-thiobiuret and di-thiobiuret derivatives of this invention can be prepared in accordance with several novel synthetic methods.

For example, in one preferred method, herein denominated as Method 3, two moles of a carbamoyl or thiocarbamoyl chloride can be reacted with one mole of an unsymmetrically disubstituted hydrazine, as shown in the following equation:

Equation 4

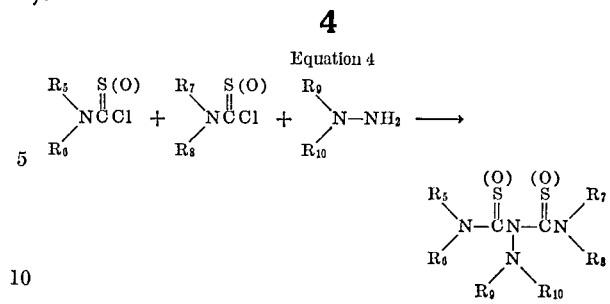

where $R_5$ to $R_{10}$ are as previously defined.

In another or alternative preferred method, denominated Method 4, a mole of carbamoyl or thiocarbamoyl chloride can be reacted with a semicarbazide or thiosemicarbazide in the presence of a strong base in accordance with the following equation:

Equation 5

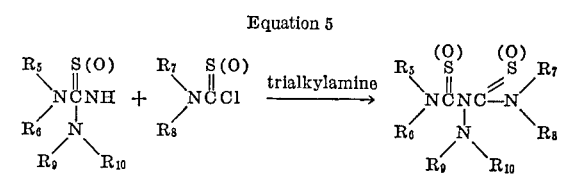

where $R_5$ to $R_{10}$ are as previously defined.

| | Typical reaction conditions for method (1) would include— | | |
|---|---|---|---|
| Molar ratio of reactants | T., °C. | P, atm. | Preferred solvents |
| Carbamoyl or thiocarbamoyl chloride:hydrazine 1:2 up to 1:20. | −20 to 100°.. | 1 | H₂O, tetrahydrofuran, acetonitrile, dimethylformamide, etc. |

| | Typical reaction conditions for method (2) and (2A) would include— | | |
|---|---|---|---|
| Step (a): Amine or hydrazine:CS₂:KOH 1:1:1. | 0 to 50°..... | 1 | H₂O, tetrahydrofuran, etc. |
| Step (b): Salt:alkyl halide 1:1, up to 1:2. | 0 to 100°..... | 1 | H₂O, ethanol, tetrahydrofuran, etc. |
| Step (c): Thioester: amine or hydrazine 1:2, up to 1:5. | 25 to 200°.... | 1–20 | H₂O, alcohol, tetrahydrofuran, etc. |

| | Typical reaction conditions for method (3) would include— | | |
|---|---|---|---|
| Carbamoyl or thiocarbamoyl:hydrazine 2:3, up to 1:25. | 0 to 150°..... | 1–5 | H₂O, tetrahydrofuran, dimethylformamide, acetonitrile, etc. |

| | Typical reaction conditions for method (4) would include— | | |
|---|---|---|---|
| Step (b): (Thio)semicarbazide:(thio)carbamoyl:base 1:1:1 up to 1:3:3. | 0 to 200...... | 1–20 | Acetonitrile, dimethylformamide, toluene, chlorinated hydrocarbons such as CHCl₃, CCl₄, perchloroethylene, etc. |

NOTE.—Preferred bases are: Trisubstituted amines, 1,4-diaza-bicyclo-2,2,2-octane, N,N-dimethylaniline, N,N-dimethylaminocyclohexane, triethylamine.

The preferred semicarbazides of this invention are the thiosemicarbazides, especially the tetra- and penta-substituted thiosemicarbazides. Accordingly, the preferred semicarbazides of this invention are characterized by the following general formulae:

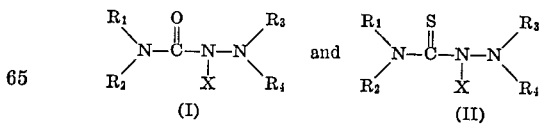

where $R_1$ to $R_4$ is a $C_1$–$C_{30}$ unsubstituted or substituted hydrocarbyl group, nitroso, cyano, or $C_1$–$C_{30}$ unsubstituted or substituted hydrocarbyloxy (OR); and X can be H, or a $C_1$–$C_{30}$ unsubstituted or substituted hydrocarbyl group. By "unsubstituted or substituted hydrocarbyl" or variants thereof above is meant (a) unsubstituted, saturated, branched, or unbranched, acyclic or cyclic $C_1$–$C_{30}$ alkyl such as methyl, ethyl, n-propyl, isopropyl, cyclopropyl, etc.

through $C_{30}$ aklyl; (b) unsubstituted, unsaturated, branched and unbranched, acyclic or cyclic, $C_2$-$C_{30}$ aliphatic such as allyl, propenyl, butenyl, etc., through the corresponding $C_{30}$ alkenyl including the corresponding cyclic forms thereof and ethynyl, propargyl, butynyl, etc., through the corresponding $C_{30}$ alkynyl including the cyclic forms thereof; (c) $C_6$-$C_{10}$ unsubstituted aryl such as phenyl, naphthyl; etc.; (d) $C_5$-$C_{30}$ mixed alkyl-aryl or aryl-alkyl such as, e.g., 3-isopropyl phenyl, 4-dodecylphenyl or benzyl, 3-naphthyl propyl, phenethyl; etc.; (e) $C_5$-$C_{10}$ unsubstituted heteroaryl such as, e.g., 2-pyridyl, 2-thienyl, 2-quinolino, 2-furyl, 3-pyrollidino, etc.; (f) $C_5$-$C_{10}$ mixed alkyl-heteroaryl or heteroalkyl such as, e.g., 2-picolyl, 2-furylethyl, 3-methylpyrollidino, etc.; (g) the substituted forms of (a)–(f) having one or more of such substituents as amino ($—NH_2$); cyano ($—CN$); thioalkyl ($—S$ ($C_1$ to $C_{30}$)); alkyl ($C_1$ to $C_{30}$); haloalkyl such as various mono- and poly-, F, $—Cl$-, Br-, or I- forms of $C_1$ to $C_{30}$ alkyl; di-($C_1$ to $C_{30}$) alkylamino; $CX_3$ where X is F, Cl, Br, or ; mono-($C_1$ to $C_{30}$)$—NH_2$; halogen (F, Cl, Br, or I); aryl ($C_6$ to $C_{10}$) thio($—S$)

amido $\left(-\overset{O}{\underset{\|}{C}}-NH_2\right)$; thiocyano($—SCN$); nitro($—NO_2$);

hydroxy($—OH$); keto $\left(-\overset{O}{\underset{\|}{C}}-\right)$; carboxy $\left(-\overset{O}{\underset{\|}{C}}OH\right)$;

ether($—OC_1$ to $—OC_{30}$); $NH\overset{}{\underset{\|}{C}}-C_1$ to $C_{30}$; $NH\overset{}{\underset{\|}{C}}-C_1$ to $C_{30}$;

$NH\overset{}{\underset{\|}{C}}NH—C_1$ to $C_{30}$; aldehydo $\left(-C\overset{O}{\underset{H}{\diagup}}\right)$; sulfhydryl($—SH$);

nitroso($—NO$); etc.

Each pair of R-groups, e.g., $R_1$ and $R_2$, $R_3$ and $R_4$, $R_5$ and $R_6$, $R_7$ and $R_8$, $R_9$ and $R_{10}$ together can also represent a group which, with the nitrogen atom to which it is attached, completes a saturated or unsaturated heterocyclic ring. This nitrogen atom can be the sole hetero atom in the aforesaid ring, as in the piperidine group, or the ring can contain one or more additional heteroatoms, particularly oxygen or nitrogen atoms as in the morpholino group. Accordingly each pair: $R_1$ and $R_2$, $R_3$ and $R_4$, $R_5$ and $R_6$, $R_7$ and $R_8$, $R_9$ and $R_{10}$ together can represent a hydrocarbon chain optionally interrupted by one or more hetero atoms.

Especially preferred semicarbazides illustrative of the foregoing general Formula I include:

1,1,4,4-tetramethylsemicarbazides;
1,1,2,4,4-pentamethylsemicarbazides;
1,1-dimethyl-4,4-diethylsemicarbazides;
1-phenyl-1,4,4-trimethylsemicarbazides; etc.

Additional semicarbazides include 1,1,4-trimethyl-4-allyl semicarbazides;
1,1,4,4-tetramethyl-2-dodecylsemicarbazides;
1-cyanoethyl-1,4,4-trimethylsemicarbazides;
1,1,2-trimethyl-4,4-di(2-chloroethyl) semicarbazides;
1,4-dimethyl-1,4-dibenzylsemicarbazides;
1,1,4-trimethyl-2-phenyl-4-propylsemicarbazides;
1,1,2-trimethyl-4,4-pentamethylenesemicarbazides;
1-(4-nitrophenyl)-1-methyl-3-N-morpholino-urea; etc.

Especially preferred thiosemicarbazides illustrative of the foregoing general Formula II include:

1,1,4,4-tetramethylthiosemicarbazides;
1,1,2,4,4-pentamethylthiosemicarbazides;
1,1-dimethyl-4,4-diethylthiosemicarbazides;
1-phenyl-1,4,4-trimethylthiosemicarbazides; etc.

Additional thiosemicarbazides include 1,1,4-trimethyl-4-allyl thiosemicarbazides;
1,1,4,4-tetramethyl-2-dodecylthiosemicarbazides;
1-cyanoethyl-1,4,4-trimethylthiosemicarbazides;
1,1,2-trimethyl-4-4-di(2-chloroethyl) thiosemicarbazides;
1,4-dimethyl-1,4-dibenzylthiosemicarbazides;
1,1,4-trimethyl-2-phenyl-4-propylthiosemicarbazides;
1,1,2-trimethyl-4,4-pentamethylenethiosemicarbazides;
1-(4-nitrophenyl)-1-methyl-3-N-morpholino-thiourea; etc.

The preferred monothio-, dithio-, or biuret compounds of this invention are characterized generally by the formula:

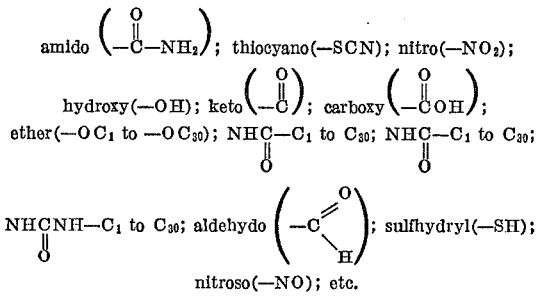

where $R_5$ to $R_{10}$ is as defined for $R_1$ to $R_4$ previously, including the substituted forms described in (a)–(c) above.

Typical preferred monothiobiurets or dithiobiurets illustrative of the foregoing general formula include:

1,1-dimethyl-3-diallylamino-5,5-pentamethylene monothiobiuret or dithiobiuret;
1,1,5,5-tetramethyl-3-N-thiomorpholino monothiobiuret or dithiobiuret;
1,5-dimethyl-1,5-diethyl-3-N-methyl-4-chloroanilino-2-thiobiuret;
1-(2-ethoxyethyl)-1-methyl-3-dipropargylamino-5,5-pentamethylene monothiobiuret or dithiobiuret;
1,1,5,5-tetramethyl-3-dimethylamino monothiobiuret or dithiobiuret;
1,1,5,5-tetramethyl-3-pentamethyleneamino monothiobiuret or dithiobiuret;
1,1,5,5-tetraethyl-3-dimethylamino monothiobiuret or dithiobiuret;
1,1,5,5-tetraethyl-3-diethylamino monothiobiuret or dithiobiuret;
1,1-dimethyl-3-dimethylamino-5,5-diethyl monothiobiuret or dithiobiuret;
1,1,5,5-tetraethyl-3-pentamethyleneamino monothiobiuret or dithiobiuret;
1,1,5,5-tetraethyl-3-hexamethylamino monothiobiuret or dithiobiuret;
1,1,5,5-tetraethyl-3-hexamethyleneamino monothiobiuret or dithiobiuret;
1,1,5,5-tetramethyl-3-di-n-propylamino monothiobiuret or dithiobiuret;
1,1,5,5-tetraethyl-3-diethylamino dithiobiuret;
1,1,5,5-tetramethyl-3-dimethylamino-2-thiobiuret;
1-dodecyl-1,5,5-trimethyl-3-dimethylamino monothiobiuret or dithiobiuret;
1,1-dimethyl-3-N-methyldodecylamino-5,5-diethyl monothiobiuret or dithiobiuret; etc.

In both of the formulas of the preferred semicarbazides and biurets above, $R_1$-$R_{10}$ and X can be of such a nature that they can be linked to their respective nitrogens by $C=O$, $C=NH$, or $C=S$ moieties so that $R_1$, $R_{10}$ and X can be represented by the following general formula:

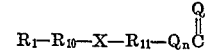

where Q is NH, O, S, or $NR_{11}$; $n$ is 0 or 1; $R_{11}$ is any substituent defined by $R_1$-$R_{10}$ and X; and $R_1$ to $R_{10}$ are as previously defined. Additionally, $R_1$-$R_{10}$ and X can be the following substituents: nitroso, cyano, and OR where R is unsubstituted or substituted hydrocarbyl, the terminology "unsubstituted or substituted hydrocarbyl" being as previously defined. Inclusion of the nitroso group on the semicarbazides or biurets of this invention can be effected by nitrosation of such semicarbazides or biurets with nitrous acid. Inclusion of the cyano group can be effected by reaction of the present semicarbazides or biurets with cyanamide or its salts, or with a cyanogen halide. Inclusion of the OR group can be effected by reaction of the present semicarbazides or biurets with a hydrocarbalkoxy amine.

As previously noted, the semicarbazides, biurets, and mono- or dithiobiurets of this invention are useful as pesticides, particularly as fungicides, bactericides and herbicides. When used the biologically active semicarbazides, biurets, and mono- or dithiobiurets are preferably formulated with a suitable carrier or diluent or combinations thereof.

The term "carrier" or "diluent" as used herein means a material, which can be inorganic or organic and synthetic or of natural origin, with which the active semicarbazides and mono- or dithiobiurets are mixed or formulated to facilitate its storage, transport, and handling and application of the plants or fungi to be treated. The carrier is preferably biologically and chemically inert and, as used, can be a solid or fluid. When solid carriers are used, they are preferably particulate; however, other shapes and sizes of solid carrier can be employed as well. Such preferable solid carriers can be natural occurring minerals—although subsequently subjected to grinding, sieving, purification, and/or other treatments—including, for example, gypsum; tripolite diatomaceous earth; mineral silicates such as mica, vermiculite, talc, and pyrophyllite, clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon.

Fluid carriers can be liquids, as for example, water, or an organic fluid, including a liquefied normally vaporous or gaseous material, or a vaporous or gaseous material, and can be solvents or non-solvents for the active material. For example, the horticultural petroleum spray oils boiling in the range of from about 275° to about 575° F., or boiling in the range of about 575° F. to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active thiosemicarbazide and mono- or dithiobiuret ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active thiosemicarbazide and mono- or dithiobiuret ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the thiosemicarbazides, biurets, and mono- or dithiobiurets mixed with a dispersing, i.e., deflocculating or suspending, agent, and, if desired, a finely divided solid carrier and/or a wetting agent. The thiosemicarbazides, biurets, and mono- or dithiobiurets can be in particulate form or adsorbed on the carrier and preferably constitute at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be non-ionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as, for example, the condensation product of oleic acid and ethylene oxide containing about 6 to 15 ethylene oxide units in the molecule. Other non-ionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acid containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

The final wetting powder should preferably have an average particle size of 5–10μ.

Where the toxicant itself is a liquid these materials can be sprayed on crops or fungi without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

The present invention is further illustrated in greater detail by the following examples, but it is to be understood that the present invention in its broadest aspects, is not necessarily limited in terms of the reactants, or specific temperatures, residence times, separation techniques, and other process conditions; or dosage levels, exposure times, etc., by which the compounds and/or compositions described and claimed are prepared and/or used.

Example 1.—Preparation of 1,1,2,4,4-pentamethyl thiosemicarbazide

A solution of 11.5 g. (0.09 mole) of dimethylthiocarbamoyl chloride in 50 ml. of tetrahydrofuran was added dropwise to a stirred solution of 13.8 g. (0.18 mole) of trimethylhydrazine in 50 ml. of tetrahydrofuran. The slightly cloudy solution was refluxed for 7 hours and stirred at room temperature overnight. The reaction mixture consisted of two layers. The upper (tetrahydrofuran) layer was evaporated in vacuo and the resulting oil was partitioned between H₂O and chloroform. The chloroform layer was dried over MgSO₄, filtered and evaporated in vacuo to yield a clear brown liquid which was vacuum distilled to yield 1,1,2,4,4 pentamethyl thiosemicarbazide, B.P. 57–67° C. @0.25 mm.

Example 2.—Preparation of 1,1,4,4-tetramethyl semicarbazide

Dimethylcarbamoyl chloride (89.2 g., 0.83 mole) was added dropwise to stirred solution of 50 g. (0.83 mole) of 1,1-dimethyl hydrazine and 83.7 g. (0.83 mole) of triethylamine in 200 ml. of tetrahydrofuran. After the initial exothermic reaction the mixture was refluxed for 4 hours, filtered and the solvent removed in vacuo. The resulting solid was crystllized from hexane to yield 62.9 g. of 1,1,4,4-tetramethyl semicarbazide (58%), M.P. 75–79° C.

*Elemental analysis.*—Calcd. for $C_5H_{13}N_3O$ (percent): C, 46.0; N, 32.2. Found (percent): C, 45.75; N, 30.74.

To form a biuret from 1,1,4,4-tetramethyl semicarbazide, 1,1,4,4-tetramethyl semicarbazide could be reacted with dimethylcarbamoyl chloride in the presence of a strong base with acetonitrile as the solvent to give 1,1,5,5-tetramethyl-3-dimethylamino biuret in accordance with the following equation:

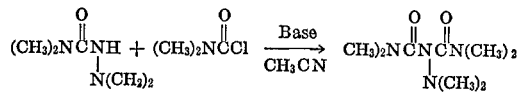

Example 3.—Preparation of 1,1,4,4-tetramethyl-thiosemicarbazide

A solution of 1 g. (0.6 mmole) of methyl-N,N-dimethyl hydrazino dithiocarbamate in 25 ml. of acetone was combined with an excess of dimethylamine (40% solution in water) in a pressure bottle. The bottle was sealed and heated on a steam bath for 45 minutes. The reaction was allowed to cool and the contents of the bottle were evaporated in vacuo. The resulting solid was recrystallized from acetone to yield a white solid, 1,1,4,4-tetramethyl thiosemicarbazide, M.P. 93° C.

*Elemental analysis.*—Calcd. for $C_5H_{13}N_3S$ (percent): C, 40.78; H, 8.89; N, 28.54; S, 21.78. Found (percent): C, 41.11; H, 8.84; N, 27.69; S, 21.64.

Example 4.—Preparation of 1,1,5,5-tetramethyl-3-dimethylamino dithiobiuret

To a stirred solution of 135 g. (2.25 mole) of unsymmetrical-dimethylhydrazine in 400 ml. of water was added in portions 92.7 g. (0.75 mole) of solid dimethylthiocarbamoyl chloride. The temperature rose to 32° C. and as the addition progressed a yellow solid deposited. When the addition was complete the temperature remained at 32° C. for one hour and the suspension was allowed to stir for an additional 48 hours. The mixture was filtered and the yellow solid was washed with water. The solid was allowed to air dry to yield 54.7 g. (61.5%) of the dithiobiuret. A sample as recrystallized from ethanol three times to yield a white solid which turned pale yellow on exposure to air, M.P. 107–107.5° C.

*Elemental analysis.*—Calcd. for $C_8H_{18}N_4S_2$ (percent): C, 40.99; H, 7.75; N, 23.90; S, 27.36. Found (percent): C, 40.66; H, 7.58; N, 23.63; S, 27.75.

The mother liquor was treated as follows which is an example of the preparation of thiosemicarbazides by this method. This is a further example of Method 1.

The aqueous mother liquor resulting from the filtration and washing of the dithiobiuret analog was extracted several times with chloroform. The organic layers were combined, dried (MgSO₄), filtered and evaporated in vacuo to yield 28.6 g. of 1,1,4,4-tetramethyl thiosemicarbazide as a brown solid. A sample was recrystallized from acetone to yield glistening white needles, M.P. 92–93° C. No depression of the melting point was observed when this material was combined with the product described under Method 2.

Example 5.—Preparation of 1,1-dimethyl-5,5-diethyl-3-dimethylamino dithiobiuret

A solution of 14.7 grams (0.1 mole) of 1,1,4,4-tetramethyl thiosemicarbazide; 15.2 grams (0.1 mole) of diethylthiocarbamoyl chloride; 11.2 grams (0.1 mole) of triethylenediamine (1,4-diaza-bicyclo 2,2,2-octane) in 50 ml. of acetonitrile was allowed to stir overnight at room temperature. The reaction mixture was filtered and the acetonitrile solution was cooled to yield 13.6 grams (52%) of the dithiobiuret as pale yellow crystals, M.P. 105–106.5° C.

*Elemental analysis.*—Calcd. for $C_{10}H_{22}N_4S_2$ (percent): C, 45.7; H, 8.38; N, 21.37; S, 24.43. Found (percent): C, 45.9; H, 8.20; N, 21.33; S, 23.90.

Example 6.—Preparation of 1,1,5,5-tetramethyl-3-dimethylamino-2-thiobiuret

A solution of 14.7 grams (0.1 mole) 1,1,4,4-tetramethyl thiosemicarbazide, 10.8 grams (0.1 mole) of dimethylcarbamoyl chloride and 11.2 grams (0.1 mole) of triethylenediamine (1,4-diaza-bicyclo 2,2,2-octane) in 150 ml. of acetonitrile was allowed to stir for 48 hours. The resulting suspension was filtered and the acetonitrile solution was evaporated in vacuo to yield a pink liquid which solidified on standing. This material was recrystallized from ether to yield 9.8 grams (45%) of the 2-thiobiuret as tan crystals, M.P. 56–57° C.

*Elemental analysis.*—Calcd. for $C_8H_{18}N_4OS$ (percent): C, 44.0; H, 8.25; N, 25.61. Found (percent): C, 44.08; H, 8.59; N, 25.58.

Example 7

Included herebelow in Table I are a number of thiosemicarbazides prepared in accordance with Methods 1 or 2 of this invention.

TABLE I

| Compound | Structure | Name | B.P. or M.P., °C. |
|---|---|---|---|
| 1 | $(CH_3)_2N\overset{S}{\overset{\|}{C}}NHN(CH_3)_2$ | 1,1,4,4-tetramethyl thiosemicarbazide | 93 |
| 2 | $(CH_3)_2N\overset{S}{\overset{\|}{C}}N\underset{CH_3}{-}N(CH_3)_2$ | 1,1,2,4,4-pentamethyl thiosemicarbazide | (¹) |
| 3 | $(C_2H_5)_2N\overset{S}{\overset{\|}{C}}NHN(CH_3)_2$ | 1,1-dimethyl-4,4-diethyl thiosemicarbazide | 77–79 |
| 4 | $(CH_3)_2N\overset{S}{\overset{\|}{C}}NHN{\overset{\phi}{\underset{CH_3}{}}}$ | 1-phenyl-1,4,4-trimethyl thiosemicarbazide | 155–157 |
| 5 | $(CH_3)_2N\overset{S}{\overset{\|}{C}}NHN{\overset{CH_3}{\underset{(CH_2)_{11}CH_3}{}}}$ | 1-n-dodecyl-1,4,4-trimethyl thiosemicarbazide | 40–42 |

See footnotes at end of table.

TABLE I—Continued

| Compound | Structure | Name | B.P. or M.P., °C. |
|---|---|---|---|
| 6 | (CH₃CH₂CH₂)₂NC(S)NHN(CH₃)₂ | 1,1-dimethyl-4,4-di-n-propyl thiosemicarbazide | 60–60.5 |
| 7 | [CH₃(CH₂)₅]₂NC(S)NHN(CH₃)₂ | 1,1-dimethyl-4,4-di-n-hexyl thiosemicarbazide | (²) |
| 8 | (CH₃)₂NC(S)N(N(CH₃)₂)C(S)N(CH₃)₂ | 1,1,5,5-tetramethyl-3-dimethylamino dithiobiuret | 107–107.5 |
| 9 | (CH₃)₂NC(S)N(piperidino)C(S)N(CH₃)₂ | 1,1,5,5-tetramethyl-3-pentamethyleneamino dithiobiuret | 124–125 |
| 10 | (C₂H₅)₂NC(S)N(N(CH₃)₂)C(S)N(C₂H₅)₂ | 1,1,5,5-tetraethyl-3-diethylamino dithiobiuret | 90–91 |
| 11 | (CH₃)₂NC(S)N(N(C₂H₅)₂)C(S)N(CH₃)₂ | 1,1,5,5-tetramethyl-3-diethylamino dithiobiuret | 66–67.5 |
| 12 | (CH₃)₂NC(S)N(N(CH₃)₂)C(S)N(C₂H₅)₂ | 1,1-dimethyl-3-dimethylamino-5,5-diethyl dithiobiuret | 105–106.5 |
| 13 | (C₂H₅)₂NC(S)N(piperidino)C(S)N(C₂H₅)₂ | 1,1,5,5-tetraethyl-3-pentamethyleneamino dithiobiuret | 63–64.5 |
| 14 | (C₂H₅)₂NC(S)N(hexamethyleneamino)C(S)N(C₂H₅)₂ | 1,1,5,5-tetraethyl-3-hexamethyleneamino dithiobiuret | 66.5–68 |
| 15 | (CH₃)₂NC(S)N(hexamethyleneamino)C(S)N(CH₃)₂ | 1,1,5,5-tetramethyl-3-hexamethyleneamino dithiobiuret | 115–116 |
| 16 | (CH₃)₂NC(S)N(N(CH₃)₂)C(O)N(CH₃)₂ | 1,1,5,5-tetramethyl-3-dimethylamino monothiobiuret | 56–57 |
| 17 | (CH₃)₂NC(S)N(N(H)COOC₂H₅)C(S)N(CH₃)₂ | 1,1,5,5-tetramethyl-3-carbethoxyamino dithiobiuret | 128–129 |
| 18 | (CH₃)₂NC(S)N(N(n-C₃H₇)₂)C(S)N(CH₃)₂ | 1,1,5,5-tetramethyl-3-di-n-propylamino dithiobiuret | 103–106 |
| 19 | (C₂H₅)₂NC(S)N(N(C₂H₅)₂)C(S)N(C₂H₅)₂ | 1,1,5,5-tetraethyl-3-diethylamino-dithiobiuret | 101–103 |
| 20 | (CH₃)₂NC(S)N(N(CH₃)₂)C(S)N(CH₂CH₂CH₃)₂ | 1,1-dimethyl-3-dimethylamino-5,5-di-n-propyl dithiobiuret | 78–79 |
| 21 | (CH₃)₂NC(S)N(N(CH₃)(CH₂)₁₁CH₃)C(S)N(CH₃)₂ | 1,1,5,5-tetramethyl-3(N-methyl dodecylamino) dithiobiuret | 51 |

¹ Boiling point 57–67° at 0.25 mm.   ² Clear oil.

Example 8

To illustrate their special utility as pesticides especially as fungicides and bactericides, a number of the compounds previously described above were tested with respect to their aforesaid fungicidal and bactericidal activity against (1) the Ascomycetes fungi, e.g. against such species as the *Venturia inequalis* (Apple Scab); *Erysiphe polygoni* (Powdery Mildew), and *Endothia parasitica* species; (2) the Phycomycetes fungi e.g. *Phytophthora infestants* (Late Blight); (3) the Basidiomycetes fungi, e.g. *Uromyces phaseoli*; (4) the Fungi Imperfecti fungi, e.g. against such species as the *Alternaria solani* (early blight), *Colletotrichum lagenarium* (anthracnose), and *Cercospera beticola* (leaf spot); and (5) the Schizomycetes fungi, e.g. against such species as the *Psudomonas phaseolicola, Staphylococcus aureus, Escheria coli,* and *Xanthomonas phaseoli* species.

The aforementioned several thiosemicarbazide and monothio- and dithiobiuret compounds of this invention as well as other such compounds have demonstrated their anti-fungal acivity both as systemic and topically applied material. These compounds have also controlled cultures of several fungi and bacteria on agar plates. The topically (foliar) applied materials have exerted their control at concentrations of 1000 p.p.m. and lower, whereas soil systemic activity has been demonstrated at concentrations of 50 lbs. per acre and lower. The test formulations actually applied to the plant were prepared in accordance with the following procedure: For example, a suggestive description is as follows:

Aqueous dilutions of the active compounds were prepared by mixing the active ingredients with varying amounts of acetone as an auxiliary solvent, adding thereto 100 p.p.m. percent by weight of commercial wetting agent consisting of Triton X-100 and diluting this premixture with at least water to the desired concentration indicated in the following tests. Triton X-100 is one of a line of commercial surfactants produced by Rohm & Haas Company and is a liquid alkyl aryl polyether alcohol that is an acid stable detergent and is non-ionic in character as an emulsifier. It is prepared by reaction of an alkyl phenol with ethylene oxide.

The tests were carried out as follows:

(1) AGAINST ASCOMYCETES (i) Against the species *Venturia inequalis*

A spray solution containing the active fungicide was applied as a protectant spray and as an eradicant spray (24 hours after inoculation with the spores) to apple seedlings.

The following results were obtained. 0=no control; 10=complete control.

| Compound according to Example No. 7, Table I | Concentration, p.p.m. | Protectant | Eradicant |
|---|---|---|---|
| 8 | 1,000 | 10 | 10 |
| Cyprex [1] | 1,000 | 10 | 9 |

[1] Cyprex is n-dodecylguanidine acetate.

(ii) Against the species *Erysiphe polygoni*

Step 1: Bean plants with fully expanded primary leaves were inoculated with spores of the powdery mildew fungus (Erysiphe polygoni) prior to application of test chemicals. The bean plants were placed on a revolving table and sprayed with a formulation containing 500 p.p.m. of the test chemical. After the spray had dried, the plants were removed to the greenhouse and held for a period of 7–10 days at the end of which time the amount of mildew on the primary leaves was rated. Ratings were on a scale of 0–10, with 0=no control and 10=100% control. Ratings of 8–10 in the primary tests justified taking the chemical to the next step.

Step 2: The same test as was followed in Step 1 was repeated for this step except that the minimum effect dose was determined in the dilution series of 100, 20, 4 p.p.m.

The standard for this test was Karathane (2-(1-methyl-n-heptyl)-4-6-dinitrophenyl crotonate). Typical values for Karathane:

| P.p.m.: | Control rating |
|---|---|
| 100 | 10 |
| 20 | 8 |
| 4 | 6 |

The following results were obtained:

| Compound according to Example No. 7, Table I | P.p.m. | Rating (0-10) |
|---|---|---|
| 8 | 500 | 10 |
| 9 | 500 | 10 |
| 18 | 200 | 9 |

(iii) Against the species *Endothia parasitica* (Chestnut Blight)

The spores of the *Endothia parasitica* organism were introduced into potato dextrose agar which contained the test chemical at a concentration of 1,000 p.p.m. The results were read as a function of the zone of inhibition around the growing spores. Thus, if there was no growth or fungus around each spore, this was interpreted as 100% control. However, if the growth was luxuriant compared to an untreated culture, inhibition in this regard was interpreted as 0%. The following results were obtained.

| Compound according to Example No. 7, Table I | P.p.m. | Rating (0-10) |
|---|---|---|
| 8 | 1,000 | 10 |
| Hexachlorophene | 1,000 | 10 |

(2) AGAINST PHYCOMYCETES (i) Against the special *Phytophthora infestans* (Late Blight)—Foliar application The test procedure followed here was the same as described in (1)(i), except that the concentration of test chemical used was 1000 p.p.m.

The following results were obtained:

| Compound according to Example No. 7, Table I | P.p.m. | Rating (0-10) |
|---|---|---|
| 8 | 500 | 10 |
| 9 | 500 | 10 |
| 10 | 500 | 10 |
| 11 | 500 | 10 |
| 1 | 500 | 6 |
| 2 | 500 | 10 |
| Maneb [1] | 500 | 10 |

[1] (Manganese ethylenebisdithiocarbamate.

(ii) Against the species *Phytophthora infestans*—Systemic application

The test compound was applied at a rate of 50 lbs. per acre to soils surrounding tomato plants which were growing in three and one-half inch pots. The plants were 4 weeks old. They were allowed to stand for 3 days in the greenhouse and then inoculated with spores of *Phytophthora infestans*. The number of spots observed were related to those observed in a control plant i.e. a tomato plant and the percent control was based on the growth on the test plant compared with the growth on the standard or control plant.

The following results were obtained.

| Compound according to Example No. 7, Table I | Lbs./acre | Rating (0-10) |
|---|---|---|
| 8 | 50 | 10 |

(3) AGAINST THE BASIDIOMYCETES FUNGI (i) Against the species *Uromyces phaseoli* (Bean rust)—Foliar application Step 1: Pinto bean plants with fully expanded primary leaves were inoculated with spores of the bean rust fungus (*Uromyces phaseoli*) and incubated for 24 hours.

The test chemicals were then applied at a concentration of 500 p.p.m. using the same method as in the early blight test above. After the spray had dried, the plants were removed to the greenhouse and held for a period of 7–10 days. At the end of this time, the amount of rust was rated on a scale of 0–10, with 0=no control, and 10=complete control. Compounds having an 8–10 rating were passed to secondary testing.

The following results were obtained:

| Compound according to Example No. 7, Table I | P.p.m. | Rating (0–10) |
|---|---|---|
| 8 | 500 | 9 |
| 9 | 500 | 8 |

(ii) Bean rust—Systemic application

Step 1: Pinto bean plants were inoculated 24 hours prior to use as above, and the soil in the pot was treated with 20 ml. of a formulation of a test chemical at 500 p.p.m. The plants were removed to the greenhouse and held for a period of 7–10 days at the end of which time the amount of rust was rated on the same scale as above. Compounds giving 8–10 ratings were passed on to the next step.

Step 2: The same test as above was performed except that the minimum effective dose was determined in a dilution series of 100, 20, and 4 p.p.m. Plantvax was used as the commercial standard in this test. Plantvax is 2,3-dihydro-5 - carboxanilido-6 - methyl-1,4-oxathiin-dioxide.

The following results were obtained:

| Compound according to Example No. 7, Table I | P.p.m. | Rating (0–10) |
|---|---|---|
| 8 | 500 | 10 |
| 9 | 500 | 8 |

(4) AGAINST FUNGI IMPERFECTI (i) Against species *Alternaria solani* (Early blight)— Foliar application with 1000 p.p.m. of test chemical Step 1: Tomato plants that were 4–5 weeks old were placed on a revolving turntable and sprayed with a formulation containing 1000 p.p.m. of the test chemical. As soon as the spray deposit had dried, the plants were inoculated with a spore suspension of the early blight fungus (*Alternaria solani*) and placed in an incubation chamber for 24 hours, after which they were removed and held until lesions had developed. Visual ratings of control (0–10) were then made, and those compounds giving 85% or better control were passed to secondary testing.

Step 2: The same test as was conducted in Step 1 was conducted in this step except that the concentration of the test chemical was lowered in the dilution series of 100, 20, and 4 p.p.m. Maneb (manganese ethylenebisdithiocarbamate) was used as a standard in this test. A typical Maneb dilution series gave the following results.

| P.p.m. | Percent control |
|---|---|
| 500 | 100 |
| 100 | 100 |
| 10 | 86 |
| 4 | 78 |
| 1 | 66 |

The following results were obtained for the test chemical.

| Compound according to Example No. 7, Table I | P.p.m. | Percent control |
|---|---|---|
| 8 | 500 | 90 |
| 12 | 500 | 80 |
| 11 | 500 | 100 |

(ii) Systemic application of *Alternaria solani*

The test compound was applied at a rate of 50 lbs. per acre to soil surrounding tomato plants which were growing in three and one-half inch pots. The plants were 4 weeks old. They were allowed to stand for 3 days in a greenhouse and then inoculated with spores of *Alternaria solani*. The number of spots observed were related to those observed in a standard or control plant and the percent control was based on the growth on the test plant contrasted with that of the sandard or control plant.

The following results were obtained:

| Compound according to Example No. 7, Table I | lbs./acre | Percent control |
|---|---|---|
| 8 | 25 | 70 |

(iii) Against species *Colletotrichum lagenarium* (Anthracnose)

Step 1: Tomato plants that were 4–5 weeks old were placed on a revolving turntable and sprayed with a formation containing 1000 p.p.m. of the test chemical. As sooon as the spray deposit had dried, the plants were inoculated with a spore suspension of *Colletotrichum lagenarium* fungus and placed in an incubation chamber for 24 hours, after which they were removed and held until lesions had developed. Visual ratings of control (0–10) were then made, and those compounds giving 85% or better control were passed to secondary testing.

Step 2: The same procedure was followed as in step 1 except that the concentration of the test chemical was lowered in the dilution series of 100, 20 and 4 p.p.m. Maneb (manganese ethylenebisdithiocarbamate) was used as the standard in this test and the typical results for the typical Maneb dilution series were as previously described.

The following results were obtained with the test chemicals:

| Compound according to Example No. 7, Table I | P.p.m. | Percent control |
|---|---|---|
| 8 | 500 | 100 |

(iv) Against species *Cercospera beticola* (leaf spot)

The test procedure followed here was the same as that employed in the preceding test above (4)(iii) relating to the fungus *Colletotrichum lagenarium*.

The following results were obtained:

| Compound according to Example No. 7, Table I | P.p.m. | Percent control |
|---|---|---|
| 8 | 500 | 99 |

(5) AGAINST THE SCHIZOMYCETE FUNGI (i) Against the species *Pseudomonas phaseolicola*

The test procedure was the same as that employed for *Endothia parasitica* as described above in (1)(iii) except that agar was used as a nutrient instead of potato dextrose.

The follownig results were obtained.

| Compound according to Example No. 7, Table I | P.p.m. | Percent control (0–100) |
|---|---|---|
| 8 | 1,000 | 100 |
| Hexachlorophene | 1,000 | 100 |

(ii) Against the species *Staphylococcus aureus*

The same test procedure was employed as was employed in the previous procedure of *Pseudomonas phaseolicola* (5)(i).

The following results were obtained.

| Compound according to Example No. 7, Table I | P.p.m. | Rating (0-10) |
|---|---|---|
| 8 | 1,000 | 100 |
| Hexachlorophene | 1,000 | 100 |

(iii) Against species *Escheria coli*

The same procedure was followed as in (5)(i) and (ii) above.

The following results were obtained:

| Compound according to Example No. 7, Table I | P.p.m. | Percent control |
|---|---|---|
| 8 | 1,000 | 100 |
| Hexachlorophene | 1,000 | 100 |

(iv) *Xanthomonas phaseoli*

The same procedure as previously employed in (5)(i), (ii), and (iii) was followed in this example.

The following results were obtained.

| Compound according to Example No. 7, Table I | P.p.m. | Percent control |
|---|---|---|
| 8 | 1,000 | 100 |
| Hexachlorophene | 1,000 | 100 |

The following example illustrates a typical pesticidal composition or formulation of this invention. Parts are by weight.

Example 9

A wettable powder concentrate that is diluted to the desired concentration by dispersing it in water has the following composition.

| | Parts |
|---|---|
| Active ingredient | 50 |
| Solid carrier (e.g. attapulgite) | 43 |
| Dispersant (monocalcium salt of polymeric alkylaryl sulfonic acid) | 5 |
| Wetting agent (sodium alkyl naphthalene sulfate (Nekal BA-75')) | 2 |

It is to be noted in Example 8 that the experimental results are given in terms of either "Rating (0-10)" or "Percent control," which are interchangeable. For example, each unit in the "Rating (0-10)" scale is equivalent to 10% in the "Percent control" scale. As an illustration, ratings of 6, 8, 9, and 10 in the 0-10 scale are equivalent to 60%, 80%, 90% and 100% in the "Percent control" scale. Thus, the experimental data set forth in Example 8 should be read in light of their interchangeability as expressed in the preceding three sentences.

While not intending to be bound or limited by any theory, it is nevertheless believed that, in the thiosemicarbazide series, pentasubstitution leads to increased fungicidal activity. In biuret series maximum activity is found where there are no N—H linkages present in the parent molecule.

It should be understood from the foregoing that the above description is merely illustrative of the preferred embodiments and specific examples of the present invention and that in all of which embodiments and examples, variations, such as, e.g. those previously described, can be made by those skilled in the art without departing from the spirit and purview thereof, the invention being defined by the following claims.

What is claimed is:

1. A compound of the formula 1,1,5,5-tetramethyl-3-dimethylamino dithiobiuret.
2. A compound of the formula 1,1,5,5-tetraethyl-3-diethylamino dithiobiuret.
3. A compound of the formula 1,1,5,5-tetramethyl-3-diethylamino dithiobiuret.
4. A compound of the formula 1,1-dimethyl-4-dimethylamino-5,5-diethyl dithiobiuret.
5. A compound of the formula 1,1,5,5-tetramethyl-3-dimethylamino monothiobiuret.
6. A compound of the formula 1,1,5,5-tetramethyl-3-di-n-propylamino dithiobiuret.
7. A compound of the formula 1,1,5,5-tetraethyl-3-diethylamino dithiobiuret.
8. A compound of the formula 1,1-dimethyl-3-dimethylamino-5,5-di-n-propyl dithiobiuret.
9. A compound of the formula 1,1,5,5-tetramethyl-3(N-methyl dodecylamino) dithiobiuret.

References Cited

UNITED STATES PATENTS 2,658,062   11/1953   Jones _____ 260—552

OTHER REFERENCES

Jensen et al.: Acta Chemica Scandinavica, vol. 22 (1968), No. 1, pp. 1, 2, 3, 4, 5, 8, 9, 18, 19, 36, 37, and frontispiece.

Iorio, Chemical Abstracts, vol. 65 (1966), col. 3861–3862.

LEON ZITVER, Primary Examiner

M. W. GLYNN, Assistant Examiner

U.S. Cl. X.R.

424—323, 244, 263, 267, 274, 275, 285; 71—88, 92, 94, 95, 99; 260—239 B, 247.1, 251 R, 290 R, 293.86, 326.83, 329 AM, 347.7, 453 R, 482 C, 554,